(12) United States Patent
Ishikawa

(10) Patent No.: US 11,367,919 B2
(45) Date of Patent: Jun. 21, 2022

(54) BATTERY PACK

(71) Applicant: Toyota Jidosha Kabushiki Kaisha, Toyota (JP)

(72) Inventor: Masayoshi Ishikawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 8 days.

(21) Appl. No.: 16/835,912

(22) Filed: Mar. 31, 2020

(65) Prior Publication Data

US 2020/0321571 A1 Oct. 8, 2020

(30) Foreign Application Priority Data

Apr. 2, 2019 (JP) .............................. JP2019-070761

(51) Int. Cl.
*H01M 50/20* (2021.01)
*H01M 50/264* (2021.01)
*H01M 50/242* (2021.01)
*H01M 10/04* (2006.01)

(52) U.S. Cl.
CPC ....... *H01M 50/20* (2021.01); *H01M 10/0468* (2013.01); *H01M 10/0481* (2013.01); *H01M 50/264* (2021.01); *H01M 50/242* (2021.01)

(58) Field of Classification Search
CPC ........... H01M 50/264; H01M 10/0468; H01M 10/0481
See application file for complete search history.

(56) References Cited

U.S. PATENT DOCUMENTS

| 6,780,540 B2 * | 8/2004 | Hoffman | H01M 50/244 429/186 |
| 2002/0034673 A1 | 3/2002 | Bisaka et al. | |
| 2005/0277012 A1 * | 12/2005 | Inagaki | H01M 8/247 429/470 |
| 2009/0239136 A1 * | 9/2009 | Nagamine | H01M 10/0481 429/148 |
| 2010/0190049 A1 | 7/2010 | Kawase et al. | |
| 2011/0027630 A1 * | 2/2011 | Tsutsumi | H01M 50/10 429/53 |

(Continued)

FOREIGN PATENT DOCUMENTS

| JP | 2001057240 A * | 2/2001 | ............. Y02E 60/10 |
| JP | 2002-124291 A | 4/2002 | |

(Continued)

OTHER PUBLICATIONS

Shimazaki, Rika, "Battery Pack", U.S. Appl. No. 16/666,753 filed prior to the filing of this application.

*Primary Examiner* — Matthew T Martin
*Assistant Examiner* — Jessie L. Walls
(74) *Attorney, Agent, or Firm* — Dinsmore & Shohl LLP

(57) ABSTRACT

A battery pack includes a retaining member disposed between an adjacent pair of cells and including a retainer retaining a spring, and a pair of tension plates each spanning between pairs of opposing edge faces of a first end plate and a second end plate in a stretched state. The retaining member includes protruding portions protruding from the cells. The protruding portions include respective grooves in which opposing side edges of each of the pair of tension plates are fitted. The side edges of each of the pair of tension plates are fitted in the respective grooves of the retaining member.

8 Claims, 11 Drawing Sheets

(56) References Cited

U.S. PATENT DOCUMENTS

| | | | | |
|---|---|---|---|---|
| 2012/0040226 A1* | 2/2012 | Kim | ................... | H01M 50/20 |
| | | | | 429/120 |
| 2014/0178736 A1* | 6/2014 | Gandhi | ............ | H01M 10/6557 |
| | | | | 429/120 |
| 2020/0091571 A1* | 3/2020 | Burgers | ................ | H01M 50/20 |

FOREIGN PATENT DOCUMENTS

| | | | | |
|---|---|---|---|---|
| JP | 2006-040845 | A | 2/2006 | |
| JP | 2009-026703 | A | 2/2009 | |
| JP | 2011-508383 | A | 3/2011 | |
| WO | WO-9905743 | A1 * | 2/1999 | ......... H01M 10/647 |
| WO | 2009085776 | A1 | 7/2009 | |

\* cited by examiner

BATTERY PACK

CROSS REFERENCE TO RELATED APPLICATIONS

The present application claims priority from Japanese Patent Application No. 2019-070761 filed on Apr. 2, 2019, which is incorporated by reference herein in its entirety.

BACKGROUND

The present disclosure relates to a battery pack.

JP 2009-026703 A discloses a method of manufacturing a battery pack in which cells (unit cells) are stacked. It is disclosed that an elastic member is arranged in a stacking direction of the cells, an end plate is arranged at an end of the stack, and a restraining member is used to restrain the stack.

SUMMARY

The present inventors have made a research on a battery pack including a plurality of stacked cells, wherein an elastic member is disposed between a pair of the stacked cells in a cell stacking direction, end plates are disposed at opposing ends of the stack, and tension plates are attached to the opposing end plates to restrain the cells and other components. In this case, the stacked cells may be apt to incline with respect to the cell stacking direction due to the elastic reaction force from the elastic members arranged between the cells, causing the entire array of cells to meander.

A battery pack disclosed herein includes a plurality of cells, a spring, a retaining member, a first end plate, a second end plate, and a pair of tension plates.

Each of the plurality of cells includes a pair of flat surfaces opposed to each other, and the plurality of cells are arranged side by side such that flat surfaces of each adjacent pair of the cells are in a face-to-face relationship.

A spring is disposed between at least one pair of adjacent cells in a direction in which the plurality of cells are arranged.

The first end plate is disposed on a flat surface of one end cell of the plurality of cells, and includes a pair of opposing edge faces.

The second end plate is disposed on a flat surface of another end cell of the plurality of cells, and includes a pair of opposing edge faces disposed so as to face in a same direction in which the pair of opposing edge faces of the first end plate face.

The pair of tension plates are mounted to span between the respective edge faces of the first end plate and the second end plate in a stretched state.

The retaining member includes protruding portions protruding from one of the cells that is adjacent to the retaining member. The protruding portions include respective grooves in which opposing side edges of each of the pair of tension plates are fitted. The opposing side edges of each of the pair of tension plates are fitted in the respective grooves of the retaining member.

Such a battery pack prevents the array of cells from meandering.

In another embodiment, the grooves may be formed so that the opposing side edges of each of the tension plates fit in the grooves in a direction normal to each of the tension plates and in a direction perpendicular to the direction in which the plurality of cells are arranged.

In another embodiment, the opposing side edges of each of the pair of tension plates may be bent toward the plurality of cells arranged side by side, and the retaining member may include a groove in which a bent portion of the edge of each one of the pair of tension plates fits.

DETAILED DESCRIPTION

The following describes embodiments of a battery pack disclosed herein. It should be noted, however, that the embodiments described herein are, of course, not intended to limit the present disclosure. The present disclosure is not limited to the embodiments described herein unless specifically stated otherwise.

Battery Pack 10

Figure 1:
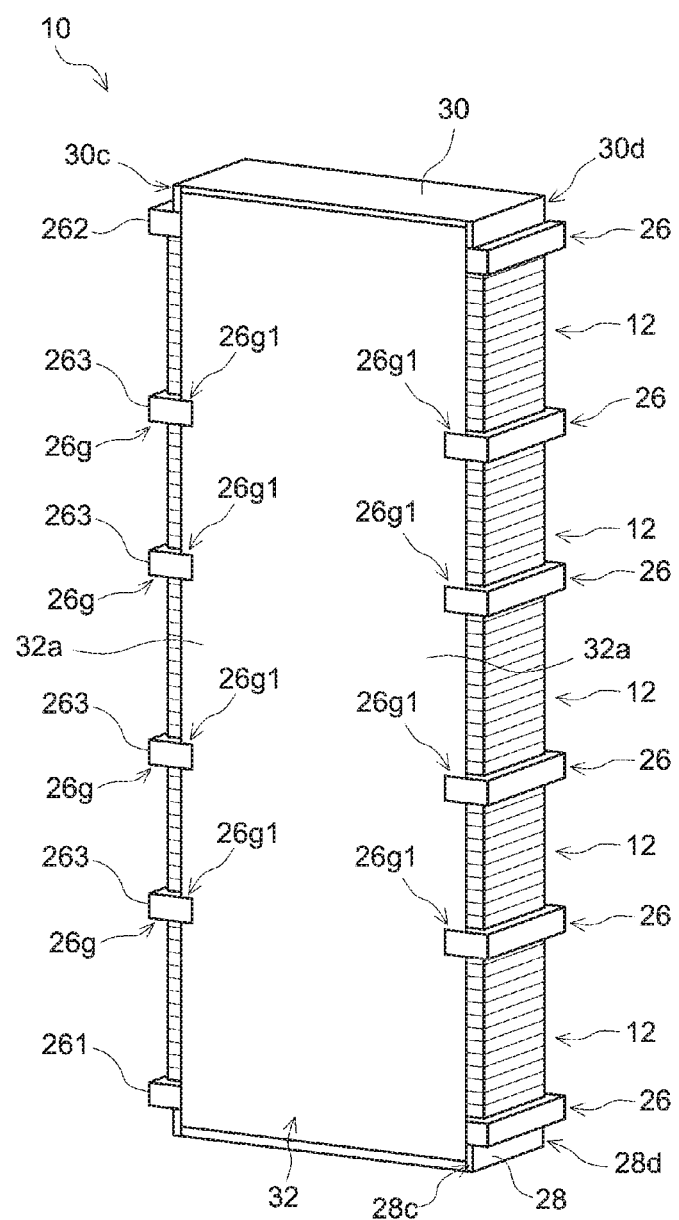
FIG. 1 is a perspective view illustrating a battery pack 10 disclosed herein.
Figure 2:
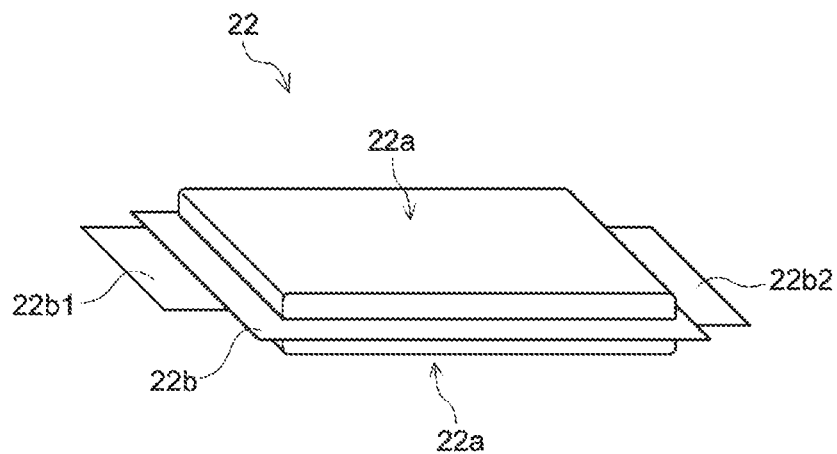
FIG. 2 is a perspective view illustrating a cell 22 incorporated in the battery pack 10.
Figure 3:
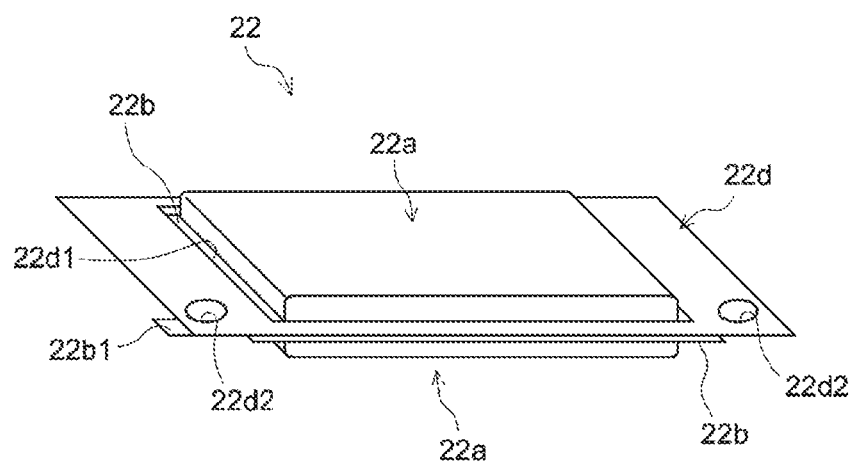
FIG. 3 is a perspective view illustrating the cell 22 to which a frame 22d is fitted.
Figure 4:
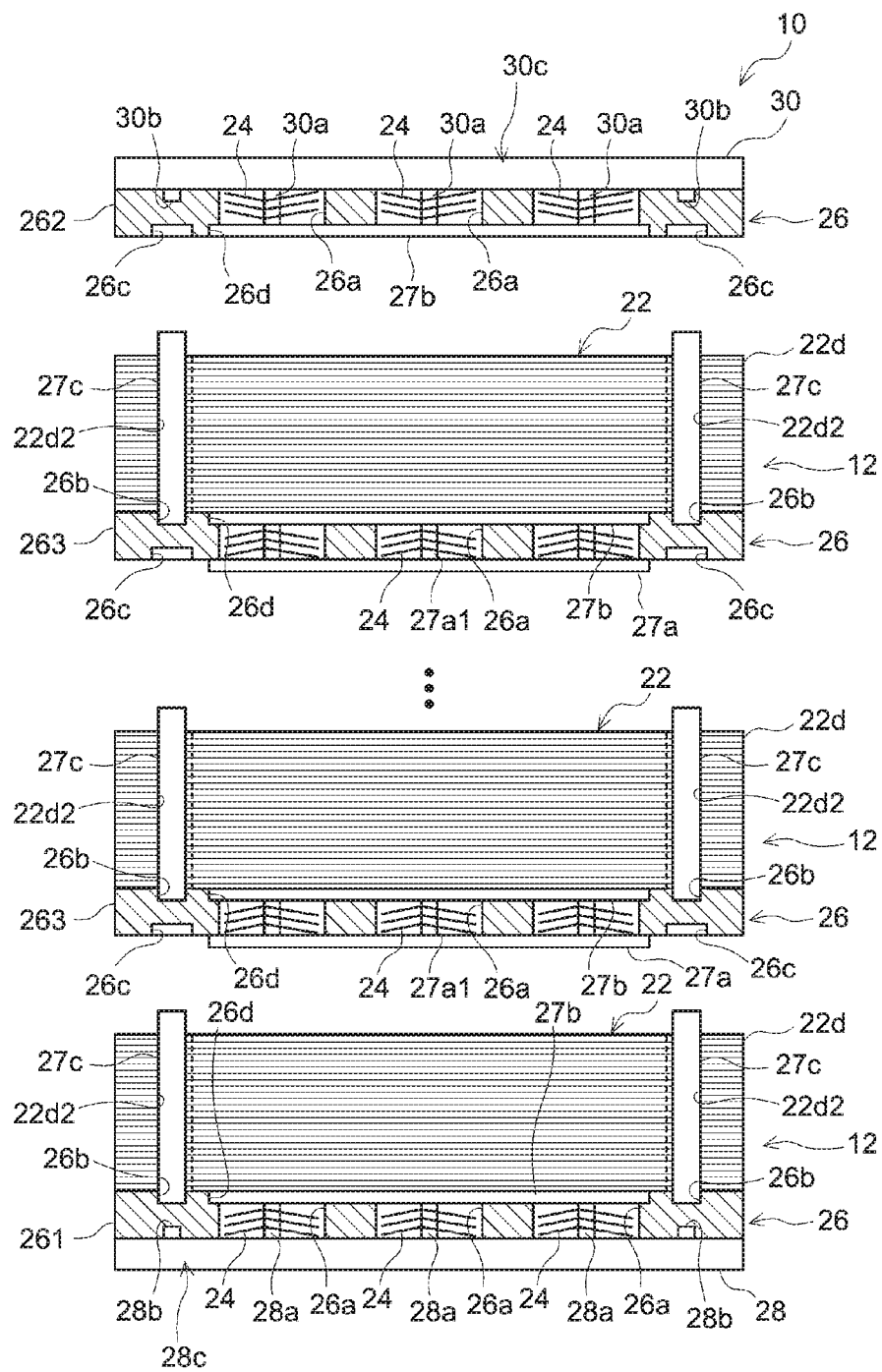
FIG. 4 is a partial cross-sectional view schematically illustrating the structure of the battery pack 10 in an expanded state.

FIG. 1 is a perspective view illustrating a battery pack 10 disclosed herein. FIG. 2 is a perspective view illustrating a cell 22 incorporated in the battery pack 10. FIG. 3 is a perspective view illustrating the cell 22 to which a frame 22d is fitted. FIG. 4 is a partial cross-sectional view schematically illustrating the structure of the battery pack 10 in an expanded state. Note that FIG. 1 illustrates a battery pack 10 to which a bus bar has not yet been installed.

As illustrated in FIGS. 1 to 4, the battery pack 10 includes a plurality of cells 22 (see FIGS. 2 and 3), a plurality of springs 24 (see FIG. 4), a plurality of retaining members 26, a pair of end plates 28 and 30, and a pair of tension plates 32 (see FIG. 1).

Cell 22

As illustrated in FIG. 2, each of the plurality of cells 22, which are incorporated in the battery pack 10, includes a pair of flat surfaces 22a opposed to each other. The plurality of cells 22 are arranged so that the flat surfaces 22a of adjacent ones of the cells 22 face each other. In this embodiment, each of the cells 22 is what is called a laminate cell, in which a laminate film is used for the outer casing for enclosing an electrode assembly. Note that each of the cells 22 is not limited to the laminate cell, unless specifically stated otherwise. Each of the cells 22 may be what is called a prismatic cell, in which an electrode assembly is enclosed in a prismatic case in a rectangular parallelepiped shape made of, for example, aluminum.

In this embodiment, the pair of opposing flat surfaces 22a are provided in a central portion of the cell 22. An electrode assembly is enclosed in the central portion of the cell 22 in which the pair of flat surfaces 22a are provided. A flat, substantially rectangular enclosing space is formed in the central portion of the cell 22. The electrode assembly enclosed in the central portion of the cell 22 includes a positive electrode active material layer and a negative electrode active material layer that are stacked one on another. The pair of flat surfaces 22a of the central portion of the cell 22 are oriented perpendicular to the direction in which the positive electrode active material layer and the negative electrode active material layer are stacked.

In this embodiment, the outer casing of the cell 22 is formed of a laminate film that is bonded at a peripheral edge portion 22b of the cell 22. A first electrode terminal 22b1 protrudes from the peripheral edge portion 22b at one of the shorter sides of the substantially rectangular-shaped cell 22. A second electrode terminal 22b2 protrudes from the peripheral edge portion 22b at the other one of the shorter sides of the cell 22. The first electrode terminal 22b1 is a positive electrode terminal, and the second electrode terminal 22b2 is a negative electrode terminal. In this embodiment, the first electrode terminal 22b1 and the second electrode terminal 22b2 of each of the cells 22 are cut so as to have different terminal patterns.

Frame 22d

In this embodiment, the first electrode terminal 22b1 and the second electrode terminal 22b2 of each of the cells 22 are cut, and thereafter, as illustrated in FIG. 3, a plate-shaped frame 22d is fitted to each of the plurality of cells 22. The frame 22d has an opening 22d1 that corresponds to the central portion of the cell 22. The opening 22d1 is fitted to the central portion of the cell 22, which encloses the electrode assembly, whereby the frame 22d is attached to the cell 22. The frame 22d protrudes from the cell 22, and corner portions of the frame 22d are provided with respective guide holes 22d2. The cells 22 are arranged, each with the frame 22d attached thereto as illustrated in FIG. 3, such that the flat surfaces 22a of each adjacent pair of the cells 22 face each other. It should be noted that each of the first electrode terminal 22b1 and the second electrode terminal 22b2 of the cell 22 has a required length so as to protrude from the frame 22d.

Figure 5:
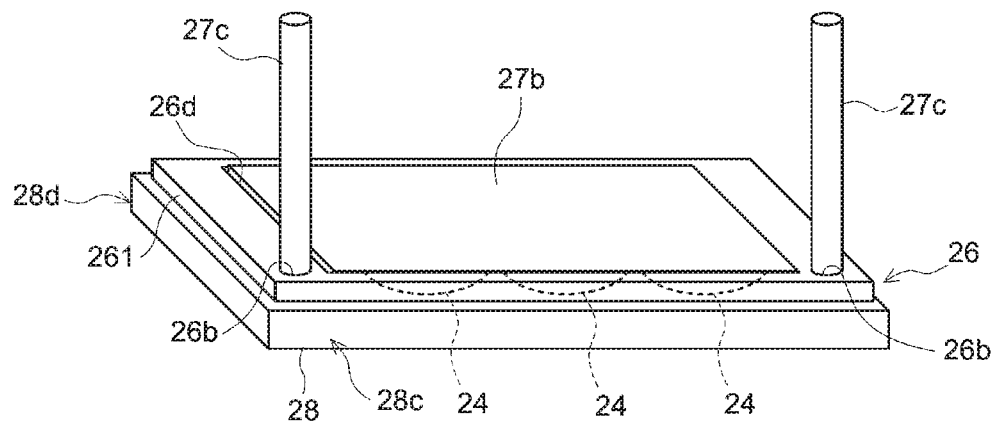
FIG. 5 is a perspective view schematically illustrating a procedure for stacking a plurality of cells 22 one on another.
Figure 6:
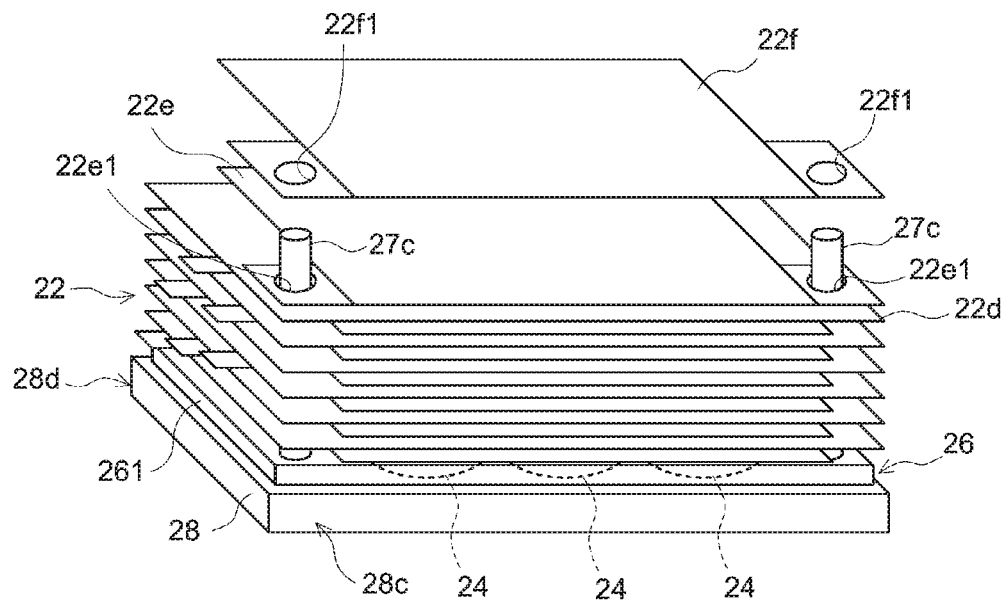
FIG. 6 is another perspective view schematically illustrating the procedure for stacking the plurality of cells 22 one on another.

FIGS. 5 and 6 are perspective views each schematically illustrating a procedure for stacking a plurality of cells 22 one on another. As illustrated in FIGS. 5 and 6, the cells 22 are stacked on a retaining member 26 that retains springs 24. As illustrated in FIG. 4, on top of the cells 22 that are stacked on the retaining member 26, another retaining member 26 that retains springs 24 is stacked, and further, a predetermined number of cells 22 are stacked thereon. In the battery pack 10, the plurality of cells 22 are stacked with retaining members 26, each retaining the springs 24, interposed therebetween. As illustrated in FIG. 4, the stacked cells 22 may be grouped by the retaining members 26 each retaining the springs 24.

FIG. 4 is an exploded view of the battery pack 10, which schematically illustrates the structure of the battery pack 10 specifically. Here, a retaining member 26 and a plurality of cells 22 stacked over the retaining member 26 form one unit, a block 12. The figure shows as if there are gaps between the blocks 12. In reality, such gaps are not present. Moreover, FIG. 4 depicts three blocks 12 between the first end plate 28 disposed at the lower end and the second end plate 30 disposed at the upper end. Furthermore, unlike that shown in FIG. 4, the number of blocks 12 provided between the first end plate 28 disposed at the lower end and the second end plate 30 disposed at the upper end is not limited to 3. The battery pack 10 may include a further greater number of stacked blocks 12.

Spring 24

Each of the springs 24 is an elastic member. In this embodiment, a Belleville spring in a circular shape is used for each of the springs 24. Each of the springs 24 is retained in the retaining member 26. As illustrated in FIG. 4, among the springs 24, springs 24 that are retained in an intermediate retaining member 263 are arranged between at least one adjacent pair of the cells 22 of the battery pack 10, with respect to the direction in which the cells 22 are stacked. Note that later-described spacers 27a and 27b are interposed between the springs 24 and the cells 22 in this embodiment.

Retaining Member 26

Each of the retaining members 26 retains springs 24. In this embodiment, the retaining member 26 is a plate-shaped member in a substantially rectangular shape. The retaining member 26 includes cavities 26a in which the springs 24 are fitted, each cavity 26a serving as a retainer that retains each of the springs 24. In the retaining member 26, the cavities 26a are formed so that three springs 24 can be retained along a longitudinal direction of the cell 22. In addition, the retaining member 26 has a size required to protrude from the portion thereof on which adjacent ones of the cells 22 are fitted. The retaining member 26 may be, for example, a resin plate having a required mechanical strength. For example, the retaining member 26 may be made of a resin, such as an ABS resin.

In this embodiment, the retaining members 26 may include three types of retaining members 26, a first retaining member 261, a second retaining member 262, and an intermediate retaining member 263. The first retaining member 261 is disposed between the bottommost one of the cells 22 and a first end plate 28 that is disposed at the lower end. As illustrated in FIG. 4, with the springs 24 being disposed therein, the intermediate retaining member 263 is disposed between an adjacent pair of the cells 22 of the battery pack 10. The second retaining member 262 is disposed between one of the cells 22 and a second end plate 30 that is disposed at the upper end.

End Plates 28 and 30

The end plates 28 and 30 are plates that are disposed at opposite ends of the battery pack 10. Each of the end plates 28 and 30 is a restraining member that restrains each of the cells 22 of the battery pack 10. Herein, the lower end plate 28 is provided with protrusions 28a for positioning the springs 24. The protrusions 28a may be provided on the upper end plate 28 so as to protrude into the cavities 26a of the first retaining member 261, which is stacked on the lower end plate 28. Likewise, the upper end plate 30 is also provided with protrusions 30a for respectively positioning the springs 24. The protrusions 30a may be provided on the end plate 30 so as to protrude into the cavities 26a of the second retaining member 262, which is stacked on the upper end plate 30.

In this embodiment, each of the pair of end plates 28 and 30 is a substantially rectangular-shaped plate. The lower end plate 28 includes a pair of opposing edge faces 28c and 28d. The upper end plate 30 includes a pair of opposing edge faces 30c and 30d that are disposed so as to face in the same direction as the direction in which the pair of opposing edge faces 28c and 28d of the lower end plate 28 face.

In this embodiment, the lower end plate 28 may also be referred to as the first end plate, as appropriate. The upper end plate 30 may be referred to as the second end plate, as appropriate. The two end plates are referred to as the first end plate and the second end plate in order to distinguish one from another, for convenience in illustration, so the terms "first" and "second" are not meant to indicate the vertical positioning thereof. Furthermore, the battery pack 10 may be arranged in a landscape orientation, and the pair of end plates 28 and 30 are not particularly limited to being disposed at the lower end and the upper end.

Spacers 27a and 27b

Each of the spacers 27a and 27b is disposed between an intermediate retaining member 263 and a cell 22. In this embodiment, a plate-shaped spacer 27a, which supports springs 24, is attached to the lower end of the intermediate retaining member 263. The just-mentioned spacer 27a is provided with protrusions 27a1, each for positioning a spring 24. The protrusions 27a1 may be provided on the spacer 27a so as to protrude into the cavities 26a of the intermediate retaining member 263.

A plate-shaped spacer 27b is disposed above the springs 24 that are retained by the first retaining member 261 or the intermediate retaining member 263. Also, another plate-shaped spacer 27b is disposed under the springs 24 that are retained by the second retaining member 262. A spacer having a required thickness may be employed selectively for each of the spacers 27a and 27b. Through the just-described spacers 27a and 27b, the elastic reaction force of the compressed springs 24 acts on each of the blocks 12 of the stacked cells 22.

Guide Shaft 27c

Each of the first retaining member 261 and the intermediate retaining member 263 includes mounting holes 26b, each for fitting a guide shaft 27c. Each of the mounting holes 26b is formed in a portion that protrudes from the portion on which an adjacent one of the cells 22 is fitted. The mounting holes 26b are formed in each of the upper surfaces of the retaining members 261 and 263. Each of the mounting holes 26b is formed so that the position of each of the guide holes 22d2, which are formed in corner portions of the frame 22d fitted to the cell 22, can fit the guide shaft 27c to be attached thereto. Each of the mounting holes 26b is formed so that the lower end of the guide shaft 27c precisely can fit into the mounting hole 26b. The lower end of the guide shaft 27c is forced into the mounting hole 26b. The guide shafts 27c fitted in the mounting holes 26b are maintained in an upright state on the first retaining member 261 and the intermediate retaining member 263.

Recesses 26c, into which the upper ends of the guide shafts 27c can fit, are provided in each of the lower surfaces of the second retaining member 262 or the intermediate retaining member 263. Taking ease of assembling into consideration, each of the recesses 26c has an inner diameter slightly greater than the outer diameter of the upper end of the guide shaft 27c. For this reason, even if the guide shaft 27c fitted in the mounting hole 26b tilts slightly, it is possible to stack the intermediate retaining member 263 and the second retaining member 262 thereon.

The following describes the procedure of stacking a plurality of cells 22 one on another.

As illustrated in FIG. 5, the lower end plate 28 is first disposed horizontally, and the first retaining member 261 is attached thereon. The lower end plate 28 is provided with protrusions 28b (see FIG. 4) for positioning the first retaining member 261. The end plate 28 is also provided with protrusions 28a that protrude into the cavities 26a of the first retaining member 261. Springs 24 are fitted onto the protrusions 28a. After the springs 24 are fitted, a spacer 27b is fitted to the first retaining member 261. The first retaining member 261 is provided with a step 26d in which the spacer 27b is to be fitted.

Next, as illustrated in FIG. 5, guide shafts 27c are fitted into the mounting holes 26b of the retaining member 261 in an upright position. As illustrated in FIG. 6, cells 22, each fitted with a frame 22d, are fitted to the guide shafts 27c attached to the retaining member 26 by inserting the guide shafts 27c through the guide holes 22d2 (see FIG. 3) of the frame 22d. As a result, the frame 22d is positioned properly along the guide shafts 27c. Each of the cells 22 is fitted with the frame 22d. Thus, the cells 22 are arranged while they are positioned properly by the guide shafts 27c and the frame 22d. Accordingly, the flat surfaces 22a of adjacent ones of the cells 22 are fitted together in a stacking direction in which the cells 22 are stacked. It is possible that cooling plates 22e may be interposed between the cells 22 as appropriate. In addition, after a predetermined number of cells 22 and a predetermined number of cooling plates 22e are stacked, a heat insulation plate 22f may be stacked thereon. Each of the cooling plates 22e and the heat insulation plates 22f may be provided with guide holes 22e1 and 22f1, through which the guide shafts 27c may be inserted. Thus, a predetermined number of cells 22 are stacked on the first retaining member 261.

Next, the cells 22 stacked on the first retaining member 261 are pressed. Subsequently, the dimension (height) of the stacked cells 22 is measured. Then, a spacer 27a having a required thickness is attached thereto, as illustrated in FIG. 4. The thickness of the spacer 27a is adjusted with respect to the thickness of a block 12 composed of the first retaining member 261 and the cells 22 stacked on the first retaining member 261. Further, the intermediate retaining member 263 is stacked thereon, and springs 24 are fitted into the cavities 26a of the intermediate retaining member 263. Here, the springs 24 are fitted onto the protrusions 27a1 of the spacer 27a. Furthermore, a spacer 27b is disposed on the intermediate retaining member 263. It is also possible that the thickness of block 12 may be adjusted by adjusting the thickness of the spacer 27b. More specifically, after the dimension (i.e., height) of the block 12, composed of the first retaining member 261 and the cells 22 stacked over the first retaining member 261, has been measured, the thickness of the spacer 27b may be adjusted so that the thickness of the block 12 can be adjusted.

Next, the guide shafts 27c are inserted through the mounting holes 26b of the intermediate retaining member 263. Then, another block 12 including a predetermined number of stacked cells 22 is formed further on top of the spacer 27b that is stacked on the intermediate retaining member 263. In each of the blocks 12, it is possible to interpose a cooling plate or a spacer between the cells 22. Thus, each of the blocks 12 is formed by stacking a plurality of cells 22 on an intermediate retaining member 263 retaining springs 24, and a predetermined number of the blocks 12 are stacked one on another. The block 12 may be pressed and the dimension (height) be measured each time a cell 22 is stacked above the retaining member 26, to adjust the thickness of the spacer 27a or the spacer 27b. This makes it possible to adjust the overall height of the battery pack 10.

A predetermined number of the blocks 12, each including stacked cells 22, are stacked, and thereafter, the second retaining member 262, the springs 24, and the end plate 30, are stacked on the upper end, with an interposed spacer 27b. The upper end plate 30 is provided with protrusions 30b for positioning the second retaining member 262.

Figure 7:
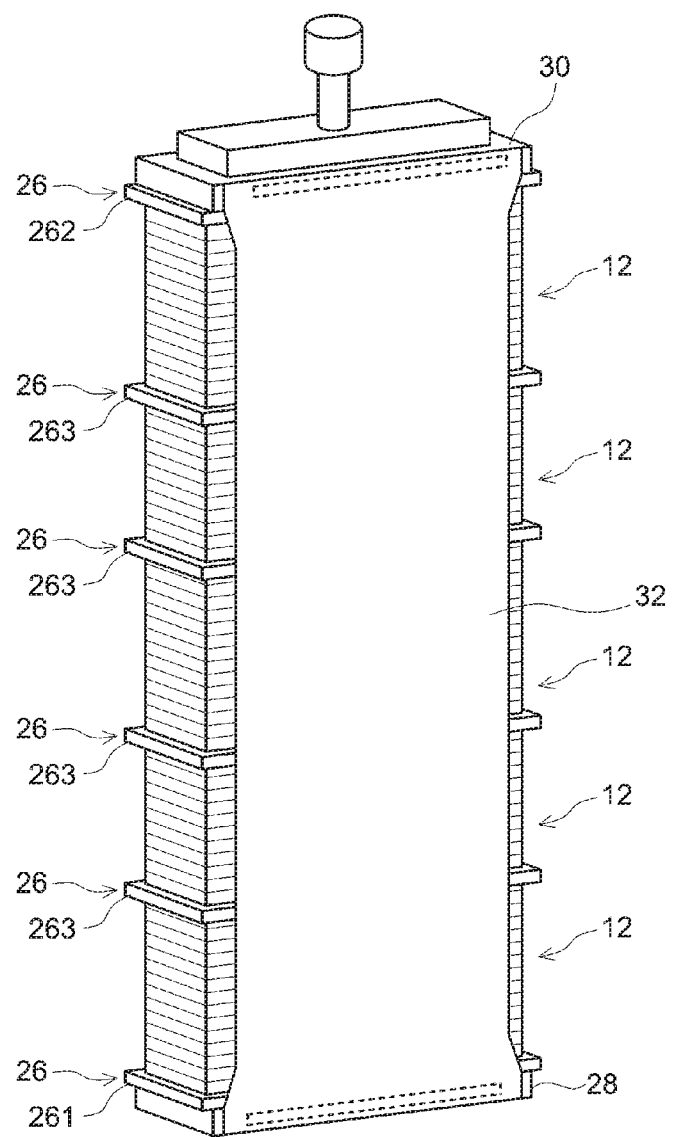
FIG. 7 is a perspective view schematically illustrating a step of installing a tension plate 32 in another configuration.

FIG. 7 is a perspective view schematically illustrating a step of installing the pair of tension plates 32. It should be noted that FIG. 7 does not illustrate an embodiment disclosed herein, but it shows a hypothetical state in which the intermediate retaining members 263 and the tension plates 32 are not joined to each other.

Herein, each of the tension plates 32 is a metal plate having a required mechanical strength. For example, it is possible to use a steel plate (for example, SPC 590) having a thickness of about 1 mm to about 3.2 mm for the tension plate 32. Herein, the thickness of the tension plate 32 is assessed by the thickness thereof that has not yet been attached to or pulled by the end plates 28 and 30.

As illustrated in FIG. 7, the end plates 28 and 30, which are respectively disposed at the lower and upper ends, are pressed in a vertical direction. At that time, the springs 24 retained by the retaining members 26 and the stacked cells 22 are compressed as a whole between the lower and upper end plates 28 and 30. Then, each of the tension plates 32 is mounted to span between the edge faces of the lower and upper end plates 28 and 30, which are in a compressed state as described above. Each of the tension plates 32 is mounted to span between ones of the edge faces of the end plates 28 and 30 at the lower and upper ends that face in the same direction. Then, each of the tension plates 32 is joined to the ones of the edge faces of the end plates 28 and 30 at the lower and upper ends. Each of the tension plates 32 is welded to the ones of edge faces of the substantially rectangular-shaped end plates 28 and 30 that are along a pair of longer sides thereof, in such a state as to span between the edge faces.

If the force compressing the lower and upper end plates 28 and 30 is removed under this condition, tension acts on the pair of tension plates 32 due to the elastic reaction force resulting from the cells 22 and the springs 24 retained by the retaining members 26. Each of the tension plates 32 is placed under the elastic reaction force from the springs 24 retained by the retaining members 26 in this way, so that the pair of tension plates 32 are brought into a stretched state by the pair of lower and upper end plates 28 and 30. On the other hand, each of the blocks 12, in which the cells 22 are arranged in a thickness direction, is placed under a required compressive load. In addition, each of the blocks 12, in which the cells 22 are arranged in a thickness direction, is united by the guide shafts 27c. The elastic reaction force of the springs 24 retained by the retaining members 26 takes effect between the blocks 12.

However, to the knowledge of the present inventors, if the force compressing the lower and upper end plates 28 and 30 is removed under this state, the blocks 12 may receive the elastic reaction force from the springs 24 and consequently lose balance. As a consequence, the blocks 12 tilt between the end plates 28 and 30. When the blocks 12 tilt, a difference in the restraining pressure that acts on the cells 22 arises between the blocks 12, and it is likely to cause variations in performance between the cells 22. In particular, when the expansion and contraction of the cells 22 are significant and it is necessary to apply a high restraining pressure to the cells 22, the springs 24 need to exert a high elastic reaction force. In such a case, a high elastic reaction force is applied to the blocks 12 by the springs 24. This means that, when the force compressing the lower and upper end plates 28 and 30 is removed, the blocks 12 are apt to lose balance and tilt.

Figure 8:
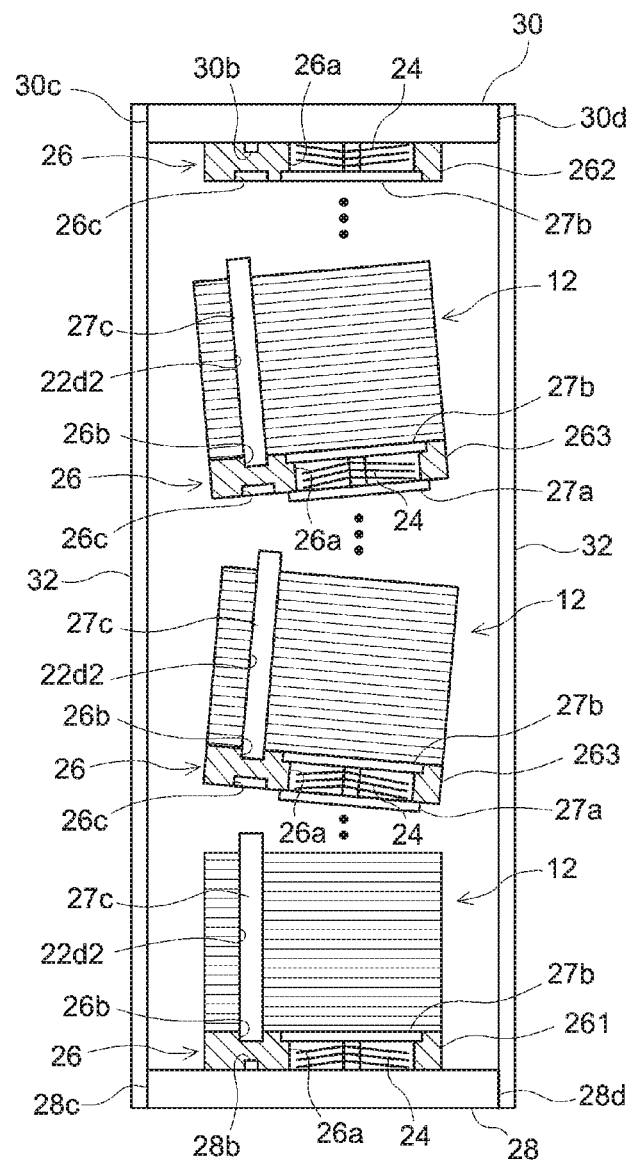
FIG. 8 is a schematic view schematically illustrating a state in which blocks 12 tilt in another configuration.

FIG. 8 is a schematic view schematically illustrating a state in which blocks 12 tilt. Note that FIG. 8 schematically illustrates a state in which each of the blocks 12 tilts when the force compressing the end plates 28 and 30 is removed. In FIG. 8, not all the blocks 12 are depicted, and the gaps depicted between the blocks 12, for example, are in fact not present. As illustrated in FIG. 8, when some of the blocks 12 tilt between the end plates 28 and 30, the entire array of the stacked cells 22 is brought into a meandering shape.

Groove 26g1

Figure 9:
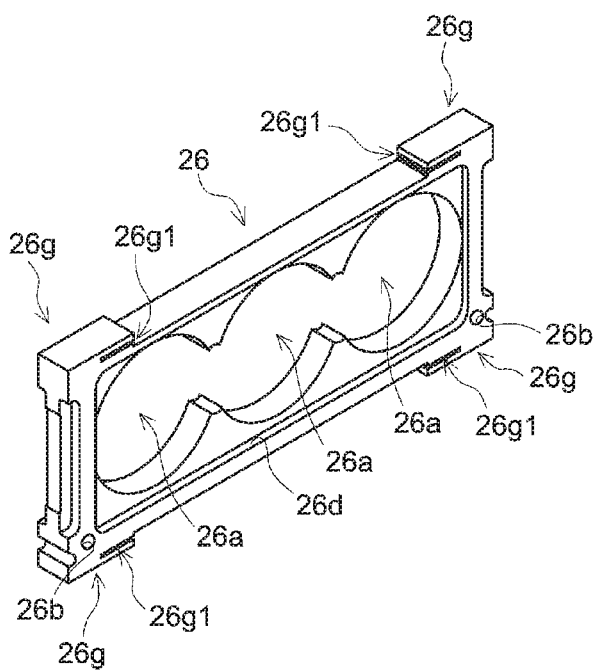
FIG. 9 is a perspective view illustrating an intermediate retaining member 263 of the battery pack 10 disclosed herein.

FIG. 9 is a perspective view illustrating an intermediate retaining member 263 of the battery pack 10 disclosed herein. In this embodiment, the intermediate retaining member 263, serving as a retaining member 26, includes protruding portions 26g each protruding from an adjacent one of the cells 22. Each of the protruding portions 26g includes a groove 26g1 in which either side edge 32a (see FIG. 1) of the pair of tension plates 32 is fitted. As illustrated in FIG. 1, the edges 32a of each of the pair of tension plates 32 are fitted respectively in the grooves 26g1 of the retaining members 26.

In the embodiment shown in FIG. 9, the intermediate retaining member 263 is a plate in a substantially rectangular shape. The edge faces of the intermediate retaining member 263 that are along its longer sides face the tension plates 32 (see FIG. 1). In this embodiment, the intermediate retaining member 263 protrudes from an adjacent cell 22 particularly at the four corners and along the shorter sides. Each of the protruding portions 26g protruding from the adjacent cell 22 includes the groove 26g1 into which a side edge 32a of one of the pair of tension plates 32 can fit. In particular, in the embodiment shown in FIG. 9, opposite portions on the longer sides of the intermediate retaining member 263 that face the tension plate 32 protrude from the cell 22 such as to be placed over the tension plate 32. In each of the protruding portions 26g protruding from the cell 22, the groove 26g1 is formed along a longer side of the intermediate retaining member 263. Each of the groove 26g1 has a required gap corresponding to the thickness of the tension plate 32 so that the side edge 32a of the tension plate 32 can be fitted therein. In other words, in this embodiment, the grooves 26g1 are formed so that the opposing side edges 32a of each of the tension plates 32 are fitted in the groove 26g1 in a direction normal to each of the pair of tension plates 32 and in a direction perpendicular to the direction in which the plurality of cells 22 are arranged.

Figure 10:
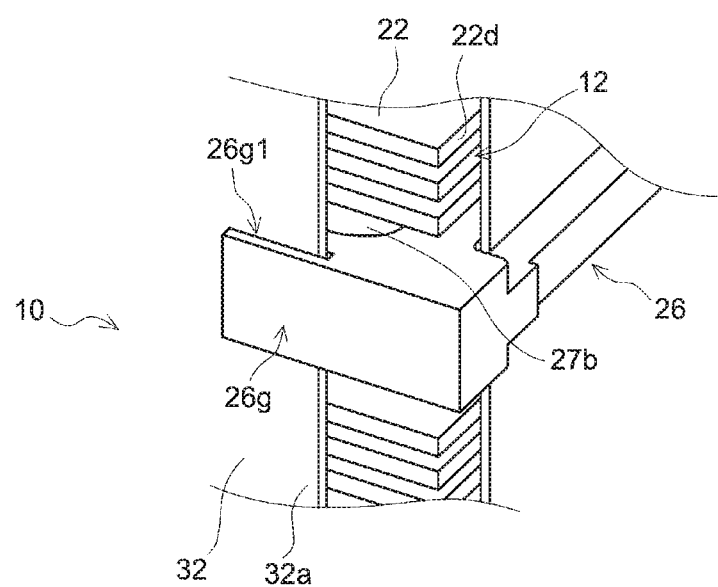
FIG. 10 is a perspective view illustrating a portion of the intermediate retaining member 263 in which a side edge 32a of one of the tension plates 32 is fitted in a groove 26g1 of one of the intermediate retaining members 263.

In this embodiment, a plurality of intermediate retaining members 263 are disposed in the battery pack 10 intermittently along the direction in which the plurality of cells 22 are arranged side by side, as illustrated in FIG. 1. In each of the intermediate retaining members 263, a portion thereof that corresponds to the edge 32a on either side of the tension plate 32 overlaps the tension plate 32 in a direction along the longer sides of the intermediate retaining member 263. In the just-described portion, the groove 26g1 is formed along the longer sides of the intermediate retaining member 263. The edges 32a of the tension plate 32 are respectively fitted into the grooves 26g1 of each of the intermediate retaining members 263. FIG. 10 is a perspective view illustrating a portion of the intermediate retaining member 263 in which a side edge 32a of one of the tension plates 32 is fitted in a groove 26g1 of one of the intermediate retaining members 263.

For example, after a plurality of cells 22 and an intermediate retaining member 263 are stacked on top of the lower end plate 28, the upper end plate 30 is stacked thereon, and the lower and upper end plates 28 and 30 are compressed with a press machine. Under this condition, the tension plate 32 is mounted while the opposing side edges of the tension plate 32 are fitted in the grooves 26g1 of each of the intermediate retaining members 263. Thus, each of the tension plates 32 is attached to the end plates 28 and 30 with the edges of the tension plate 32 being fitted in the grooves 26g1 of the intermediate retaining members 263. In this embodiment, each of the tension plates 32 is welded to each of the end plates 28 and 30.

Thereafter, the force compressing the end plates 28 and 30 is removed. In this embodiment, the edges 32a of the tension plate 32 are respectively fitted into the grooves 26g1 of each of the intermediate retaining members 263. When the force compressing the end plates 28 and 30 is removed, the elastic reaction force of the cells 22 and the springs 24 that have been compressed by the end plates 28 and 30 is exerted on the end plates 28 and 30. This causes the tension plate 32 to be stretched by the end plates 28 and 30. In this embodiment, the tension plate 32 is a thin steel plate. The tension plate 32 is stretched by the end plates 28 and 30, to thereby exhibit required rigidity. The edges 32a of the tension plate 32 are fitted respectively in the grooves 26g1 of each of the intermediate retaining members 263. This enables the tension plate 32 to keep the posture of each of the intermediate retaining members 263. As a result, when the force compressing the lower and upper end plates 28 and 30 is removed, the posture of each of the blocks 12 is maintained. Thus, because the posture of each of the blocks 12 is maintained in this way, the stacked cells 22 are prevented from causing a meandering state.

As described above, the retaining member 26 includes the protruding portions protruding from the cell 22 adjacent thereto. The protruding portions include the respective grooves 26g1 into which opposing side edges 32a of each of the pair of tension plates 32 can fit. The side edges 32a of each of the pair of tension plates 32 are respectively fitted in the grooves 26g1 of the retaining member 26. This means that, when the force compressing the end plates 28 and 30 is removed, the retaining members 26 can be supported by the tension plates 32. As a result, the stacked cells 22 are prevented from being brought into a meandering state, and the difference in restraining pressure acting on the cells 22 stacked on the retaining members 26 is reduced. Therefore, it is possible to reduce variations in performance between the cells 22.

In the embodiment illustrated in FIGS. 1, 9, and 10, each of the grooves 26g1 of the intermediate retaining member 263 is formed so that the opposing side edges 32a of each of the tension plates 32 is fitted in the groove 26g1 in a direction normal to each of the pair of tension plates 32 and in a direction perpendicular to the direction in which the plurality of cells 22 are arranged. However, the structures of the tension plate 32 and the grooves 26g1 are not limited to the ones described above.

Figure 11:
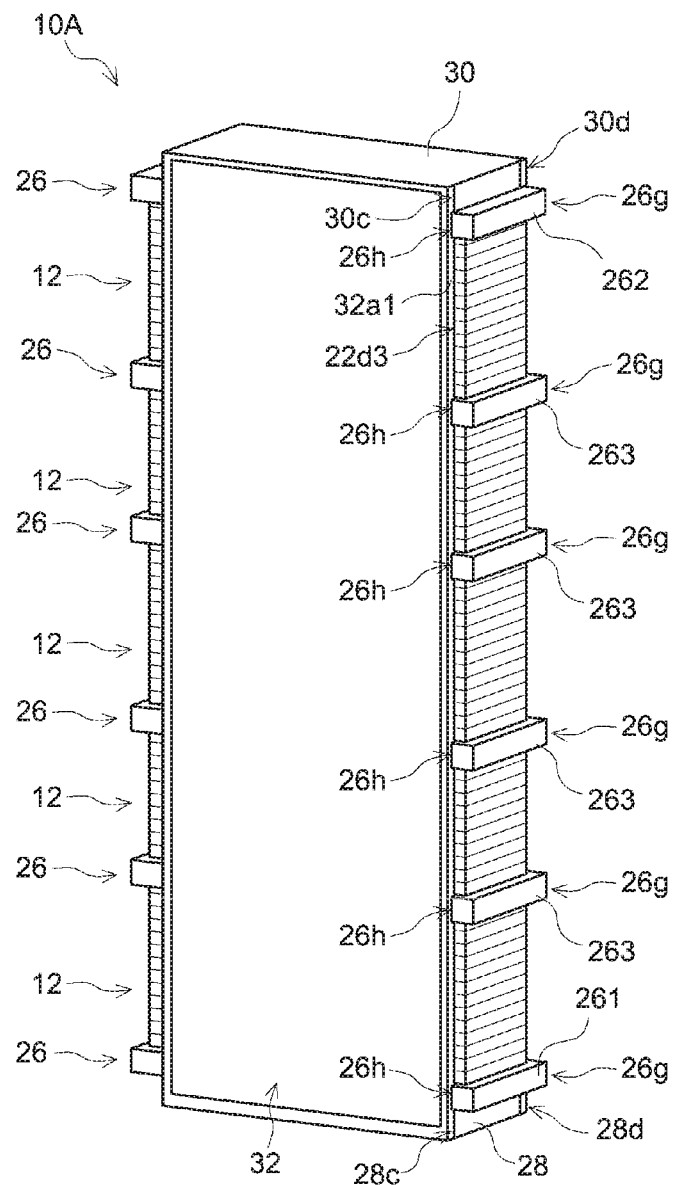
FIG. 11 is a perspective view illustrating a battery pack 10A according to another embodiment of the disclosure.
Figure 12:
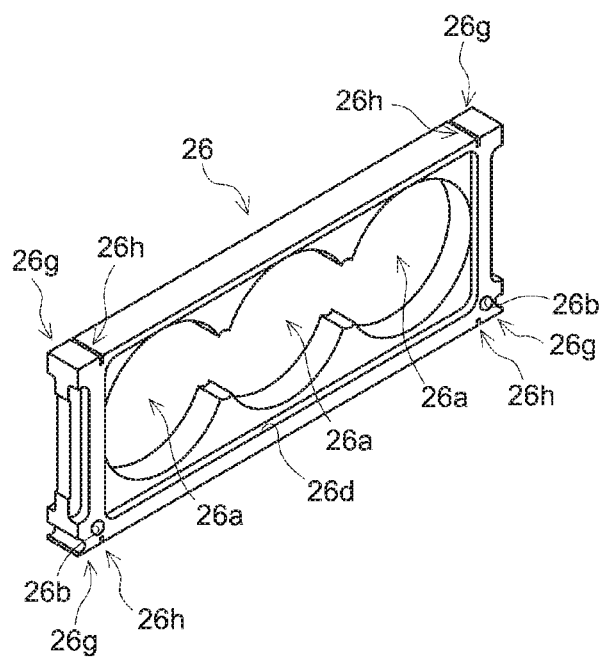
FIG. 12 is a perspective view of another intermediate retaining member 263.
Figure 13:
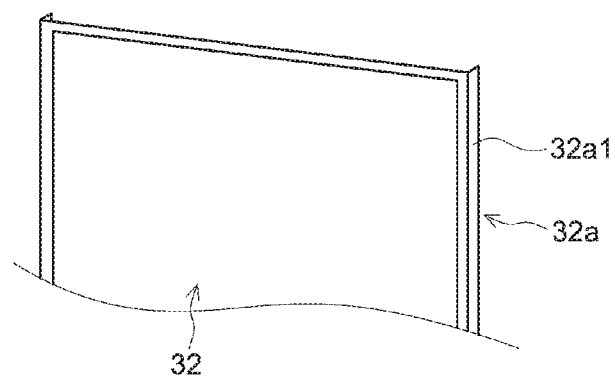
FIG. 13 is a perspective view of another tension plate 32.
Figure 14:
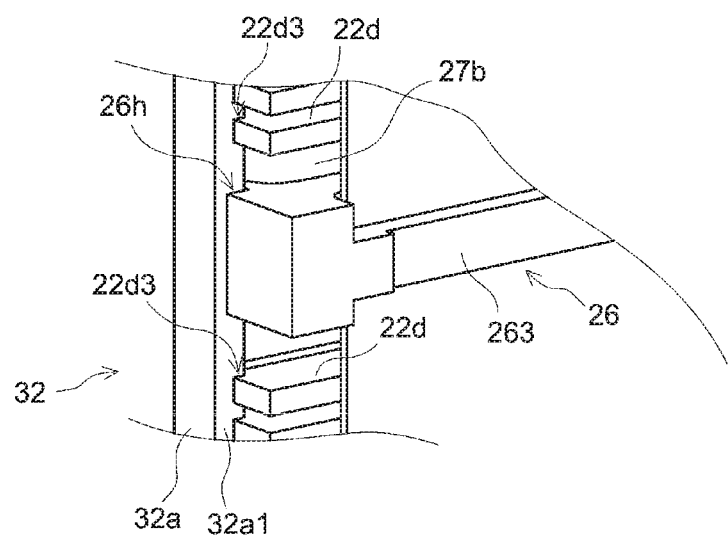
FIG. 14 is a perspective view illustrating a portion of the intermediate retaining member 263 in which a side edge 32a of one of the tension plates 32 is fitted in a groove 26h of the intermediate retaining member 263.

FIG. 11 is a perspective view illustrating a battery pack 10A according to another embodiment of the disclosure. FIG. 12 is a perspective view of another intermediate retaining member 263. FIG. 13 is a perspective view of another tension plate 32. FIG. 14 is a perspective view illustrating a portion of the intermediate retaining member 263 in which a side edge 32a of one of the tension plates 32 is fitted in a groove 26h of the intermediate retaining member 263.

Bent Portion 32a1

In the embodiment shown in FIG. 11, opposing side edges 32a of the tension plate 32 are bent toward the plurality of stacked cell 22, as illustrated in FIG. 13. In this embodiment, each of the end plates 28 and 30 is a substantially rectangular-shaped plate. The tension plate 32 is mounted to fit on an edge face along the longitudinal direction of each of the end plates 28 and 30. The tension plate 32 may have the same width as, or a slightly greater width than, the width of the end plates 28 and 30 along the longitudinal direction of the end plates 28 and 30. As illustrated in FIG. 11, the opposing side edges 32a of the tension plate 32 are bent so as to fit along the opposing sides of the end plates 28 and 30. It should be noted that the bent portions 32a1 of the tension plate 32 are not limited to the just-described structure. For example, portions of the tension plate 32 that are joined to the end plates 28 and 30 may not be provided with the bent portions 32a1. The bent portions 32a1 of the tension plate 32 may be provided only in a portion thereof that faces the cells 22 and the retaining members 26.

Groove 26h

The retaining member 26 includes grooves 26h into which the bent portions 32a1 of the side edges 32a of the tension plate 32 can fit. In this embodiment, as illustrated in FIG. 13, the grooves 26h are formed so that the opposing side edges 32a of each of the tension plates 32 can fit in the grooves 26l in a direction normal to each of the pair of tension plates 32 and in a direction perpendicular to the direction in which the plurality of cells 22 are arranged.

FIG. 12 shows a perspective view of another intermediate retaining member 263 serving as a retaining member 26. As illustrated in FIG. 12, the intermediate retaining member 263 includes grooves 26h in the edge faces facing the tension plates 32 along a longitudinal direction. The grooves 26h are formed in the edge faces of the intermediate retaining member 263 along the longitudinal direction at a predetermined gap and with a predetermined width and a predetermined depth so that the bent portions 32a1 of the edges 32a of each of the tension plates 32 can be fitted therein.

In this battery pack 10A, a side edge 32a of the tension plate 32 is fitted into a groove 26h of the intermediate retaining member 263, as illustrated in FIG. 14. In this embodiment, the frame 22d attached to each of the cells 22 is also provided with a groove 22d3 into which the bent portion 32a1 of the tension plate 32 can fit, as illustrated in FIG. 14. In this embodiment, the first retaining member 261 disposed on the lower end plate 28 and the second retaining member 262 disposed on the upper end plate 30 are also provided with grooves 26h into which the bent portions 32a1 of each of the tension plates 32 can fit, as illustrated in FIG. 11. In the embodiment shown in FIG. 11, each of the frames 22d attached to the cells 22 is provided with the groove 22d3 in which the bent portion 32a1 of the tension plate 32 fits. The frame 22d that is attached to the cell 22 may be constructed so as not to interfere with the tension plates 32. The frame 22d may not be provided with the above-described groove 22d3.

For example, after a plurality of cells 22 and a retaining member 26 are stacked on top of the lower end plate 28, the upper end plate 30 is stacked thereon, and the lower and upper end plates 28 and 30 are compressed with a press machine. Under this condition, each of the tension plates 32 is mounted to fit the edge faces of each of the end plates 28 and 30 that are along the longer sides thereof while the bent portions 32a1 on opposing sides are fitted into the grooves 26h of each of the retaining members 26. In this embodiment, the bent portions 32a1 of each of the tension plates 32 are also fitted into the grooves 22d3 of the frame 22d. Thus, each of the tension plates 32 is attached to the end plates 28 and 30 with the bent portions 32a1 of the tension plate 32 being fitted in the grooves 26h of the intermediate retaining members 263 and in the grooves 22d3 of the frames 22d. In this embodiment, each of the tension plates 32 is welded to each of the end plates 28 and 30.

Thereafter, the force compressing the end plates 28 and 30 is removed. In this embodiment, the edges 32a of the tension plate 32 are respectively fitted in the grooves 26h of each of the intermediate retaining members 263. When the force compressing the end plates 28 and 30 is removed, the elastic reaction force of the cells 22 and the springs 24 that have been compressed by the end plates 28 and 30 is exerted on the end plates 28 and 30. As a result, the tension plate 32 is stretched by the end plates 28 and 30, to exhibit required rigidity. The bent portions 32a1 of the tension plate 32 are fitted respectively in the grooves 26h of each of the intermediate retaining members 263. This enables the tension plate 32 to keep the posture of each of the intermediate retaining members 263. As a result, when the force compressing the lower and upper end plates 28 and 30 is removed, the posture of each of the blocks 12 is maintained. Thus, because the posture of each of the blocks 12 is maintained in this way, the stacked cells 22 are prevented from causing a meandering state. Moreover, in this embodiment, the bent portion 32a1 of the tension plate 32 is also fitted into the groove 22d3 of each of the frames 22d attached to the cells 22. Thus, the posture of each of the frames 22d attached to the cells 22 is also maintained by the tension plate 32. As a result, it is easier to maintain the posture of each of the blocks 12.

As described above, the retaining member 26 includes the protruding portions protruding from the cell 22 adjacent thereto, and each of the protruding portions includes the groove 26h into which the bent portion 32a1 at either side edge 32a of each one of the pair of tension plates 32 can fit. The side edges 32a of each of the pair of tension plates 32 are respectively fitted in the grooves 26g1 of the retaining member 26. This means that, when the force compressing the end plates 28 and 30 is removed, the retaining members 26 can be supported by the tension plates 32. As a result, the stacked cells 22 are prevented from being brought into a meandering state, and the difference in restraining pressure acting on the cells 22 stacked on the retaining members 26 is reduced. Therefore, it is possible to reduce variations in performance between the cells 22.

In the embodiments of the battery pack 10 disclosed herein, each of the edges 32a of the pair of tension plates 32 is fitted in the grooves 26g1 or 26h of the retaining member 26, as illustrated in FIG. 1 or 11. This means that, when the force compressing the end plates 28 and 30 is removed, the retaining members 26 can be supported by the tension plates 32. This serves to keep the posture of each of the retaining members 26 and reduce the difference in restraining pressure acting on the cells 22 stacked on the retaining members 26. As a result, it is possible to reduce variations in performance between the cells 22. Moreover, although the edges 32a of the pair of tension plates 32 are fitted in the grooves 26g1 or 26h of the retaining members 26, the retaining members 26 are able to move along the tension plates 32 while keeping the posture with respect to the tension plates 32. This means that, when the force that acts on the retaining member 26 varies from one side of the retaining member 26 to another due to, for example, expansion and contraction of the cells 22, each of the retaining members 26 is able to move to an appropriate position. Therefore, it is possible to reduce the difference in the restraining pressure acting on the cells 22 in the overall battery pack 10. As a result, it is possible to reduce variations in performance between the cells 22.

Various embodiments of the battery pack have been described hereinabove according the present disclosure. Unless specifically stated otherwise, the embodiments of the battery pack described herein do not limit the scope of the present disclosure. It should be noted that various other modifications and alterations may be possible in the embodiments of the battery pack disclosed herein. In addition, the features, structures, or steps described herein may be omitted as appropriate, or may be combined in any suitable combinations, unless specifically stated otherwise.

What is claimed is:
1. A battery pack comprising:
a plurality of cells, each including a pair of flat surfaces opposed to each other, the plurality of cells being arranged side by side such that flat surfaces of each adjacent pair of the cells are in a face-to-face relationship;
a plurality of springs disposed between at least one pair of adjacent cells in a direction in which the plurality of cells are arranged;
a retaining member disposed between adjacent ones of the cells and including a retainer defining a cavity retaining the plurality of springs;
a first end plate disposed on a flat surface of one end cell of the plurality of cells, the first end plate including a pair of opposing edge faces;
a second end plate disposed on a flat surface of another end cell of the plurality of cells, the second end plate including a pair of opposing edge faces disposed so as to face in a same direction in which the pair of opposing edge faces of the first end plate face; and
a pair of tension plates each spanning between the pair of opposing edge faces of the first end plate and the pair of opposing edge faces of the second end plate in a stretched state, under tension, wherein:
the retaining member includes protruding portions;

the protruding portions include respective grooves in which opposing side edges of each of the pair of tension plates are fitted;

the opposing side edges of each of the pair of tension plates are respectively fitted to the respective grooves of the retaining member; and the grooves are formed so that the opposing side edges of each of the tension plates fit in the grooves in a direction to normal to each of the tension plates and in a direction perpendicular to the direction in which the plurality of cells are arranged.

2. The battery pack of claim 1, wherein:

the retainer defines a plurality of cavities, each cavity of the plurality of cavities retaining a respective spring of the plurality of springs.

3. The battery pack of claim 1, wherein:

the first end plate includes a plurality of protrusions, each protrusion of the plurality of protrusions is received within the cavity of the retainer, each spring of the plurality of springs is fitted onto a respective protrusion of the plurality of protrusions.

4. The battery pack of claim 1, further comprising:

a plurality of guide shafts, each guide shaft of the plurality of guide shafts is received within a respective mounting hole formed in the retaining member.

5. A battery pack comprising:

a plurality of cells, each including a pair of flat surfaces opposed to each other, the plurality of cells being arranged side by side such that flat surfaces of each adjacent pair of the cells are in a face-to-face relationship;

a plurality of springs disposed between at least one pair of adjacent cells in a direction in which the plurality of cells are arranged;

a retaining member disposed between adjacent ones of the cells and including a retainer defining a cavity retaining the plurality of springs;

a first end plate disposed on a flat surface of one end cell of the plurality of cells, the first end plate including a pair of opposing edge faces;

a second end plate disposed on a flat surface of another end cell of the plurality of cells, the second end plate including a pair of opposing edge faces disposed so as to face in a same direction in which the pair of opposing edge faces of the first end plate face; and a pair of tension plates each spanning between the pair of opposing edge faces of the first end plate and the pair of opposing edge faces of the second end plate in a stretched state, under tension, wherein:

the retaining member includes protruding portions;

the protruding portions include respective grooves in which opposing side edges of each of the pair of tension plates are fitted;

the opposing side edges of each of the pair of tension plates are respectively fitted to the respective grooves of the retaining member;

the side edges of each of the pair of tension plates are bent toward the plurality of cells arranged side by side; and a bent portion of each of the side edges of the pair of tension plates is fitted within the groove of the retaining member.

6. The battery pack of claim 5, wherein:

the retainer defines a plurality of cavities, each cavity of the plurality of cavities retaining a respective spring of the plurality of springs.

7. The battery pack of claim 5, wherein:

the first end plate includes a plurality of protrusions, each protrusion of the plurality of protrusions is received within the cavity of the retainer, each spring of the plurality of springs is fitted onto a respective protrusion of the plurality of protrusions.

8. The battery pack of claim 5, further comprising:

a plurality of guide shafts, each guide shaft of the plurality of guide shafts is received within a respective mounting hole formed in the retaining member.

* * * * *